United States Patent
Ono et al.

(10) Patent No.: US 10,322,726 B2
(45) Date of Patent: Jun. 18, 2019

(54) GEAR SHIFTING CONTROL DEVICE

(71) Applicant: HONDA MOTOR CO., LTD., Minato-ku, Tokyo (JP)

(72) Inventors: Junya Ono, Wako (JP); Tatsuya Ryuzaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/904,586

(22) Filed: Feb. 26, 2018

(65) Prior Publication Data

US 2018/0273042 A1  Sep. 27, 2018

(30) Foreign Application Priority Data

Mar. 24, 2017 (JP) ................... 2017-058618

(51) Int. Cl.
*B60W 30/19* (2012.01)
*F16H 63/50* (2006.01)
(Continued)

(52) U.S. Cl.
CPC ........ *B60W 30/19* (2013.01); *B60W 50/0097* (2013.01); *F16H 63/50* (2013.01);
(Continued)

(58) Field of Classification Search
CPC ............. B60W 30/19; B60W 50/0097; B60W 2510/0216; B60W 2540/14;
(Continued)

(56) References Cited

U.S. PATENT DOCUMENTS

| 5,894,758 A | 4/1999 | Walker |
|---|---|---|
| 2007/0026994 A1 | 2/2007 | Matsuda et al. |

(Continued)

FOREIGN PATENT DOCUMENTS

| DE | 102010015037 | 10/2011 |
|---|---|---|
| JP | 05-026065 | 2/1993 |

OTHER PUBLICATIONS

Extended European Search Report for European Patent Application No. 18159071.2 dated Jul. 24, 2018.

*Primary Examiner* — Erick R Solis
(74) *Attorney, Agent, or Firm* — Amin, Turocy & Watson LLP

(57) ABSTRACT

This gear shifting control device is equipped with a pedal operation detection unit (42) and a control unit (60). The control unit (60) includes a change rate calculation unit (60a) which calculates a time change rate (DFSA) of a pedal load detection value (FS), a load prediction unit (60b) which obtains a pedal load prediction value (FSC), a pedal load determination unit (60c) which determines whether or not the pedal load detection value (FS) reaches a first threshold value (FSCC), a predicted value determination unit (60d) which determines whether or not the pedal load prediction value (FSC) exceeds a second threshold value (FSCTC) when the pedal load detection value (FS) reaches the first threshold value (FSCC), and an output suppression control unit (60e) which performs output suppression control when it is determined that the pedal load prediction value (FSC) exceeds the second threshold value (FSCTC).

8 Claims, 8 Drawing Sheets

(51) Int. Cl.
*B60W 50/00* (2006.01)
*F16H 59/02* (2006.01)
*F02B 61/02* (2006.01)

(52) U.S. Cl.
CPC ... *F16H 63/502* (2013.01); *B60W 2510/0604* (2013.01); *B60W 2510/0638* (2013.01); *B60W 2540/165* (2013.01); *B60W 2710/06* (2013.01); *B60W 2710/1005* (2013.01); *F02B 61/02* (2013.01); *F16H 2059/0234* (2013.01)

(58) Field of Classification Search
CPC ..... B60W 2540/165; B60W 2710/023; B60W 2710/105; B60W 2710/1061; F16H 63/502
See application file for complete search history.

(56) References Cited

U.S. PATENT DOCUMENTS

| | | | |
|---|---|---|---|
| 2009/0210122 A1 | 8/2009 | Tao et al. | |
| 2013/0150213 A1* | 6/2013 | Chae | B60W 10/06 477/182 |
| 2016/0339920 A1* | 11/2016 | Banker | B60W 30/19 |
| 2018/0162404 A1* | 6/2018 | Jang | B60W 30/19 |

* cited by examiner

GEAR SHIFTING CONTROL DEVICE

CROSS-REFERENCE TO RELATED APPLICATION

The present application claims priority based on Japanese Patent Application No. 2017-058618 filed Mar. 24, 2017, the content of which is incorporated herein by reference.

BACKGROUND OF THE INVENTION

Field of the Invention

The present invention relates to a gear shifting control device.

Description of Related Art

Conventionally, Japanese Unexamined Patent Application, First Publication No. H05-26065 discloses a so-called power shift in which, in a gear shifting control device, a shift operation detection device for detecting a gear shifting operation of a rider is added to a shift mechanism of a manual operation, and by performing output suppression control of an engine in accordance with a rider's gear shifting operation, gear shifting (shift-up) is performed without a clutch operation. In such a gear shifting control device, for example, as the shift operation detection device, a pressure sensor is provided on a connecting rod of a shift pedal, a threshold value for starting the engine control is set in a detection value of the pressure sensor, and exceeding the threshold value is a trigger to start the engine control.

SUMMARY OF THE INVENTION

Incidentally, before the driving force loss of the gearbox occurs due to the output suppression control of the engine, the shift pedal load due to the rider's gear shifting operation increases. When the shift pedal load exceeds the threshold value, the driving force loss of the gearbox occurs due to the output suppression control of the engine, and the gear shifting operation of the gearbox is performed by the shift pedal load. At this time, when the shift mechanism operates and an increase in the shift pedal load stops, the rider recognizes the completion of the gear shifting operation.

However, when the rider quickly performs the gear shifting operation, the peak value of the shift pedal load rises before the rider recognizes the completion of the gear shifting operation, and the gear shifting operation may feel heavy. On the other hand, if the threshold value is set to be low, regardless of whether the rider intends to shift the gear, when the rider's foot touches the shift pedal due to the movement of the body during driving, there is a possibility of the shift operation detection device erroneously detecting the gear shifting operation. For this reason, it is desired to achieve a shift feeling which is not affected by the speed of the gear shifting operation, while setting the threshold value to a somewhat higher value.

Therefore, an aspect of the present invention is to improve the shift feeling by suppressing the variation in the pedal peak load due to a difference in the speed of the gear shifting operation in the gear shifting control device which performs the gear shifting operation with the shift pedal.

In order to achieve the above-mentioned object, a gear shifting control device according to an aspect of the present invention employs the following configuration.

(1) An aspect of the present invention is a gear shifting control device equipped with a pedal operation detection unit which detects a gear shifting operation of a shift pedal, and a control unit which performs output suppression control for suppressing output of an engine in accordance with the gear shifting operation detected by the pedal operation detection unit. The control unit includes a change rate calculation unit which calculates a time change rate of a pedal load detection value detected by the pedal operation detection unit, a load prediction unit which obtains a pedal load prediction value after a specified time elapses from the time change rate, a pedal load determination unit which determines whether or not the pedal load detection value reaches a first threshold value, a predicted value determination unit which determines whether or not the pedal load prediction value exceeds a second threshold value when the pedal load detection value reaches the first threshold value, and an output suppression control unit which performs the output suppression control when it is determined that the pedal load prediction value exceeds the second threshold value.

According to the aspect of (1), in the gear shifting control device which performs the gear shifting operation with the shift pedal, the time change rate of the pedal load detection value by the pedal operation detection unit is obtained, the pedal load prediction value after the elapse of the specified time from the time change rate is obtained, and when it is determined that the pedal load prediction value exceeds the second threshold value, the output suppression control of the engine is performed. This makes it possible to start the output suppression control of the engine in advance before the actual pedal load detection value reaches the second threshold value. Therefore, even when a quick gear shifting operation is performed, it is possible to start the output suppression control at an early stage of the gear shifting operation. On the other hand, since the pedal load prediction value is obtained from the time change rate of the pedal load detection value, erroneous detection of the gear shifting operation is also suppressed. Further, since the drive force loss of the gearbox is caused in advance to start the gear shifting operation, excessive application of the shift pedal load is suppressed. Therefore, it is possible to suppress variations in the pedal peak load due to the difference in the speed of the gear shifting operation, and to improve the shift feeling.

(2) In the aspect of (1), the load prediction unit may calculate the pedal load prediction value by adding a change amount obtained by multiplying the time change rate by the specified time to the current pedal load detection value.

According to the aspect of (2), since the pedal load prediction value is obtained by a simple calculation of merely adding the value obtained by multiplying the time change rate by the specified time to the current pedal load detection value, it is possible to reduce the processing load on the control unit and to suppress delay of the engine control.

(3) In the aspect of (1), the change rate calculation unit may calculate an average value of pedal load differences obtained from the multiple pedal load detection values consecutively detected at a control cycle as the time change rate.

According to the aspect of (3), since the time change rate is calculated as the average value of the pedal load differences obtained from the multiple pedal load detection values, the processing load of the control unit can be reduced, and even when a single abnormal value occurs in the pedal load detection value, it is possible to reduce the influence of the erroneous detection on the engine control.

(4) In the aspect of (3), the change rate calculation unit may calculate an average value of the multiple consecutive pedal load differences as the time change rate.

According to the aspect of (4), since the average value of multiple consecutive pedal load differences is calculated as the time change rate, it is possible to reduce the processing load of the control unit and to reduce the influence of the erroneous detection on the engine control.

(5) In the aspect of (1), the predicted value determination unit may determine whether or not the pedal load prediction value obtained from the latest time change rate exceeds the second threshold value when the pedal load detection value reaches the first threshold value.

According to the aspect of (5), when the pedal load detection value reaches the first threshold value, by determining the pedal load prediction value obtained from the latest time change rate, it is possible to perform the engine control immediately responding to the gear shifting operation.

(6) In the aspect of (1), the change rate calculation unit may always calculate the time change rate during operation of the engine.

According to the aspect of (6), since the time change rate of the pedal load detection value is always calculated during the operation of the engine, even when the gear shifting operation is quickly performed, it is always possible to obtain the latest time change rate close to the instant of the gear shifting operation, and to suppress a delay in the engine control with respect to the gear shifting operation.

(7) In the aspect of (1), the load prediction unit may enable the specified time multiplied by the time change rate to be set within a range of 10 to 70 msec.

According to the aspect of (7), by enabling the specified time multiplied by the time change rate to be set within the range of 10 to 70 msec, it is possible to regulate the specified time multiplied by the time change rate in accordance with the characteristics of the vehicle equipped with the gear shifting control device, and it is possible to enhance the accuracy of the pedal load prediction value to perform the engine control at a good timing.

(8) In the aspect of (1), the shift pedal may perform a gear shifting operation of a dog mission connected to the engine, and the load prediction unit may enable the specified time multiplied by the time change rate to be set within a range of 30 to 50 msec.

According to the aspect of (8), since the specified time multiplied by the time change rate can be set within the range of 30 to 50 msec in accordance with the time of 30 to 50 msec required for the gear shifting operation of the dog mission, the engine control can be performed at a good timing.

According to the aspect of the present invention, it is possible to improve the shift feeling by suppressing the variation in the peak load of the pedal due to the differences in the speed of the gear shifting operation in the gear shifting control device that performs the gear shifting operation with the shift pedal.

DESCRIPTION OF EMBODIMENTS

Figure 1:
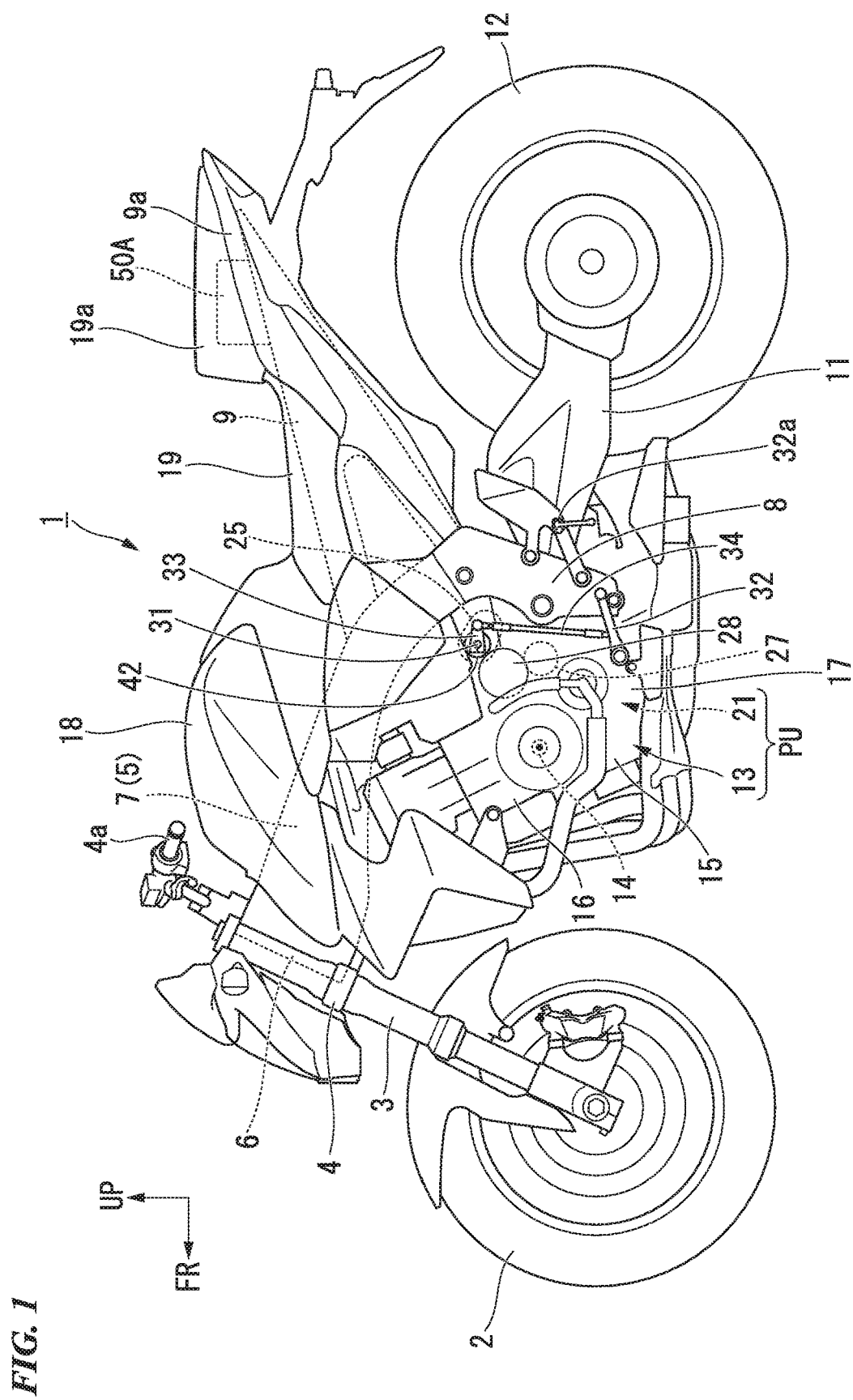
FIG. 1 is a left side view of a motorcycle according to an embodiment of the present invention.

Hereinafter, embodiments of the present invention will be described with reference to the accompanying drawings. Further, directions of forward, rearward, leftward, rightward, and so on, to be described below are the same as directions of a vehicle to be described below unless the context clearly indicates otherwise. In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

As shown in FIG. 1, an embodiment is applied to a motorcycle 1, which is a saddle riding vehicle. A front wheel 2 of the motorcycle 1 is supported by lower end portions of a pair of left and right front forks 3. Upper sections of the left and right front forks 3 are supported by a head pipe 6 of a front end portion of a vehicle body frame 5 via a steering stem 4. A bar type steering handle 4a is attached to a top bridge of the steering stem 4.

The vehicle body frame 5 includes the head pipe 6, main tubes 7 extending from the head pipe 6 toward a lower rear side at a center in vehicle width direction (a leftward/rightward direction), left and right pivot frames 8 continuous with lower sides of rear end portions of the main tubes 7, and a seat frame 9 continuous with rear sides of the main tubes 7 and the left and right pivot frames 8. Front end portions of swing arms 11 are swingably pivoted in the left and right pivot frames 8. A rear wheel 12 of the motorcycle 1 is supported by the rear end portions of the swing arms 11.

A fuel tank 18 is supported over the left and right main tubes 7. A front seat 19 and a rear seat cover 19a are supported over the seat frame 9 behind the fuel tank 18 to be arranged in a forward/rearward direction. Surroundings of the seat frame 9 are covered by a rear cowl 9a. A power unit PU serving as a prime mover of the motorcycle 1 is hung from lower sides of the left and right main tubes 7. The power unit PU is linked to the rear wheel 12 via, for example, a chain type transmission mechanism.

The power unit PU integrally has an engine 13 disposed at a front side thereof and a gearbox 21 disposed at a rear side thereof. The engine 13 is, for example, a multiple cylinder engine having a rotary shaft of a crankshaft 14 in a leftward/rightward direction (a vehicle width direction). The engine 13 has a cylinder 16 standing up above a front section of a crank case 15. A rear section of the crank case 15 is a gearbox case 17 configured to accommodate the gearbox 21.

Figure 2:
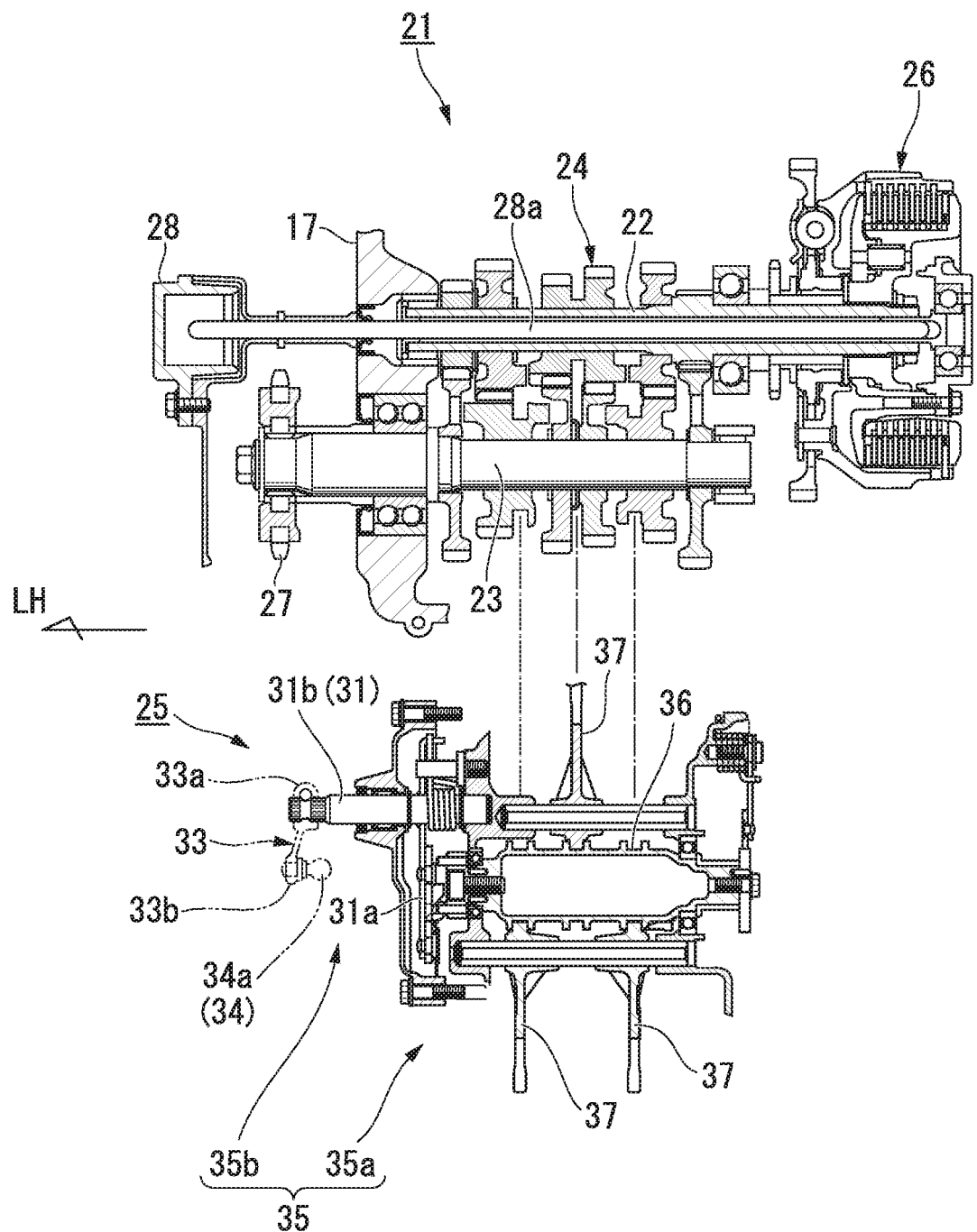
FIG. 2 is a cross-sectional view of a gearbox and a change mechanism of the motorcycle.

As shown in FIG. 2, the gearbox 21 is a stepped transmission having a main shaft 22 and a counter shaft 23, and a shifting gear group 24 that bridges both of the shafts 22 and 23. The counter shaft 23 constitutes an output shaft of the gearbox 21, and consequently, the power unit PU. An end portion of the counter shaft 23 protrudes toward a left side of a rear section of the crank case 15 and is connected to the rear wheel 12 via the chain type transmission mechanism.

The shifting gear group 24 has gears corresponding to the number of shifting stages each supported by both of the shafts 22 and 23. The gearbox 21 is a constant mesh type in which the corresponding gear pairs of the shifting gear group 24 always mesh with each other between both of the shafts 22 and 23. The plurality of gears supported by both of the shafts 22 and 23 are classified into a free gear rotatable with respect to the corresponding shaft and a slide gear (shifter) spline-fitted to the corresponding shaft. An axially convex dog is provided in one of the free gear and the slide gear, and an axially concave slot engaging the dog is provided in the other thereof. That is, the gearbox 21 is a so-called dog mission.

Figure 3:
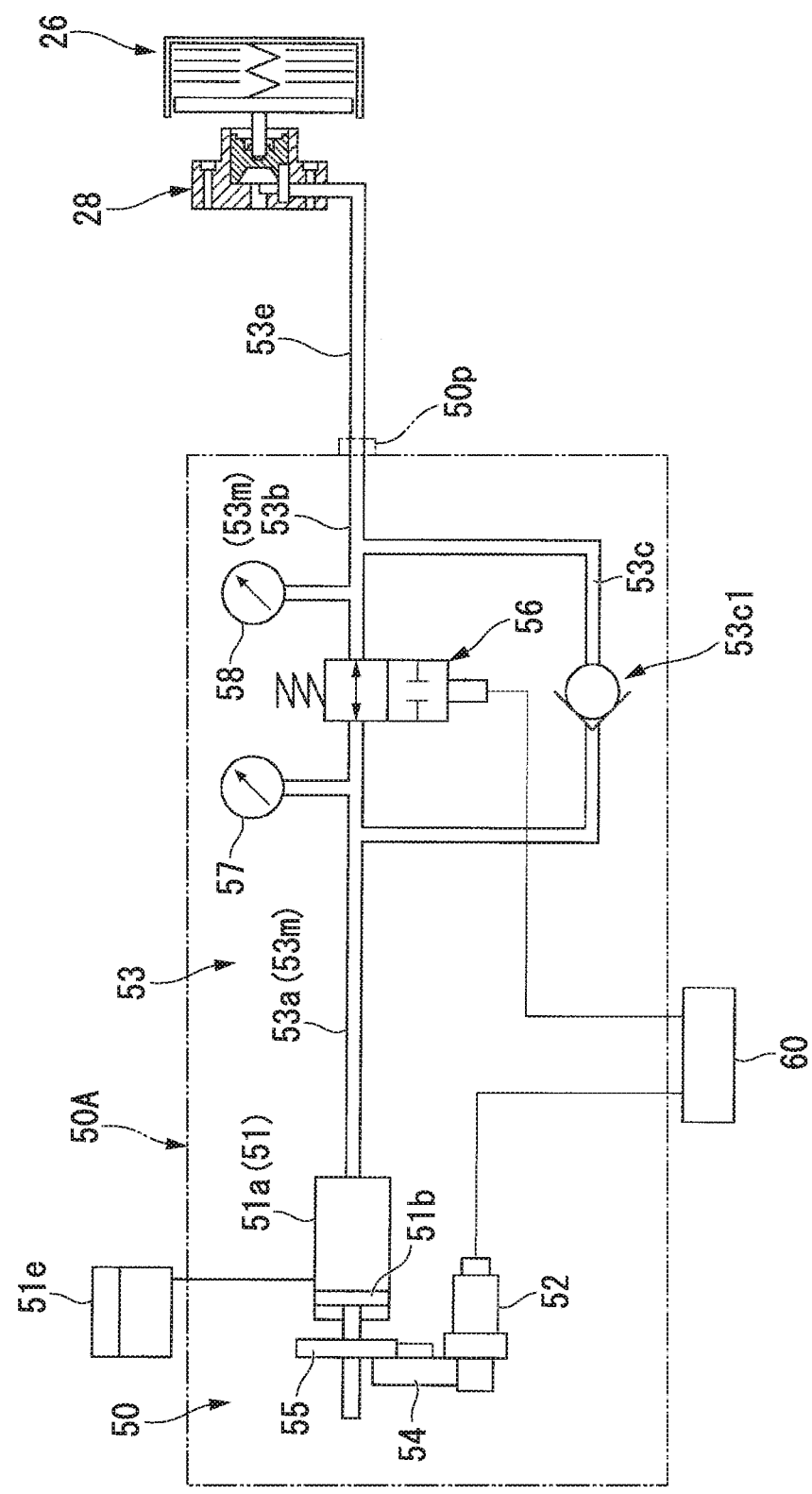
FIG. 3 is a view for schematically describing a clutch operation system including a clutch actuator.

Referring also to FIG. 3, the main shaft 22 and the counter shaft 23 of the gearbox 21 are disposed behind the crankshaft 14 to be arranged in the forward/rearward direction. A clutch device 26 operated by a clutch actuator 50 is disposed coaxially with a right end portion of the main shaft 22. The clutch device 26 is, for example, a multi-plate wet clutch, which is a so-called normal open clutch. That is, the clutch device 26 is in a connected state in which power transmission is made possible by supply of a hydraulic pressure from the clutch actuator 50, and returns to a cut state in which power transmission is impossible when no hydraulic pressure from the clutch actuator 50 is supplied.

Referring to FIG. 2, rotary power of the crankshaft 14 is transmitted to the main shaft 22 via the clutch device 26 and transmitted to the counter shaft 23 from the main shaft 22 via an arbitrary gear pair of the shifting gear group 24. A drive sprocket 27 of the chain type transmission mechanism is attached to a left end portion of the counter shaft 23 protruding toward a left side of a rear section of the crank case 15.

A change mechanism 25 configured to change a gear pair of the shifting gear group 24 is accommodated in the gearbox 21 on a rear upper side thereof. The change mechanism 25 operates a plurality of shift forks 37 according to a pattern of a lead groove formed on an outer circumference thereof due to rotation of a hollow cylindrical shift drum 36 parallel to both of the shafts 22 and 23, and changes a gear pair using power transmission between the shafts 22 and 23 in the shifting gear group 24.

The change mechanism 25 has a shift spindle 31 parallel to the shift drum 36. During pivotal movement of the shift spindle 31, a shift arm 31a fixed to the shift spindle 31 rotates the shift drum 36, moves the shift forks 37 in the axial direction according to a pattern of the lead groove, and changes a gear pair that enables power transmission in the shifting gear group 24 (i.e., changes a shifting stage).

The shift spindle 31 causes an outer shaft section 31b to protrude outward (toward a left side) from the crank case 15 in the vehicle width direction so that the change mechanism 25 can be operated. A shift load sensor 42 (a pedal operation detection unit) is attached coaxially to the outer shaft section 31b of the shift spindle 31 (see FIG. 1). A swing lever 33 is attached to the outer shaft section 31b of the shift spindle 31 (or a pivot shaft of the shift load sensor 42). The swing lever 33 extends rearward from a base end portion 33a fixed to the shift spindle 31 (or the pivot shaft) by a clamp, and an upper end portion of a link rod 34 is swingably connected to a tip portion 33b thereof via an upper ball joint 34a. A lower end portion of the link rod 34 is swingably connected to a shift pedal 32 operated by a driver's foot via a lower ball joint (not shown).

As shown in FIG. 1, a front end portion of the shift pedal 32 is vertically swingably supported by a lower section of the crank case 15 via a shaft in the leftward/rightward direction. A pedal section on which a driver's foot placed on a step 32a is put is formed on a rear end portion of the shift pedal 32, and a lower end portion of the link rod 34 is connected to an intermediate section of the shift pedal 32 in the forward/rearward direction.

As shown in FIG. 2, a shift change apparatus 35 including the shift pedal 32, the link rod 34 and the change mechanism 25 and configured to change a shifting stage gear of the gearbox 21 is provided. In the shift change apparatus 35, an assembly (the shift drum 36, the shift forks 37, and so on) configured to change a shifting stage of the gearbox 21 in the gearbox case 17 is referred to as a shift operation section 35a, and an assembly (the shift spindle 31, the shift arm 31a, and so on) configured to pivot the shift spindle 31 into which a shift operation to the shift pedal 32 is input around the axis thereof and transmit the pivotal movement to the shift operation section 35a is referred to as a shifting operation receiving section 35b.

Here, the motorcycle 1 employs a so-called semi-automatic gear shift system in which only a shifting operation of the gearbox 21 (a foot operation of the shift pedal 32) is performed by a driver, and a cutting and connecting operation of the clutch device 26 is automatically performed by electric control according to an operation of the shift pedal 32.

Figure 4:
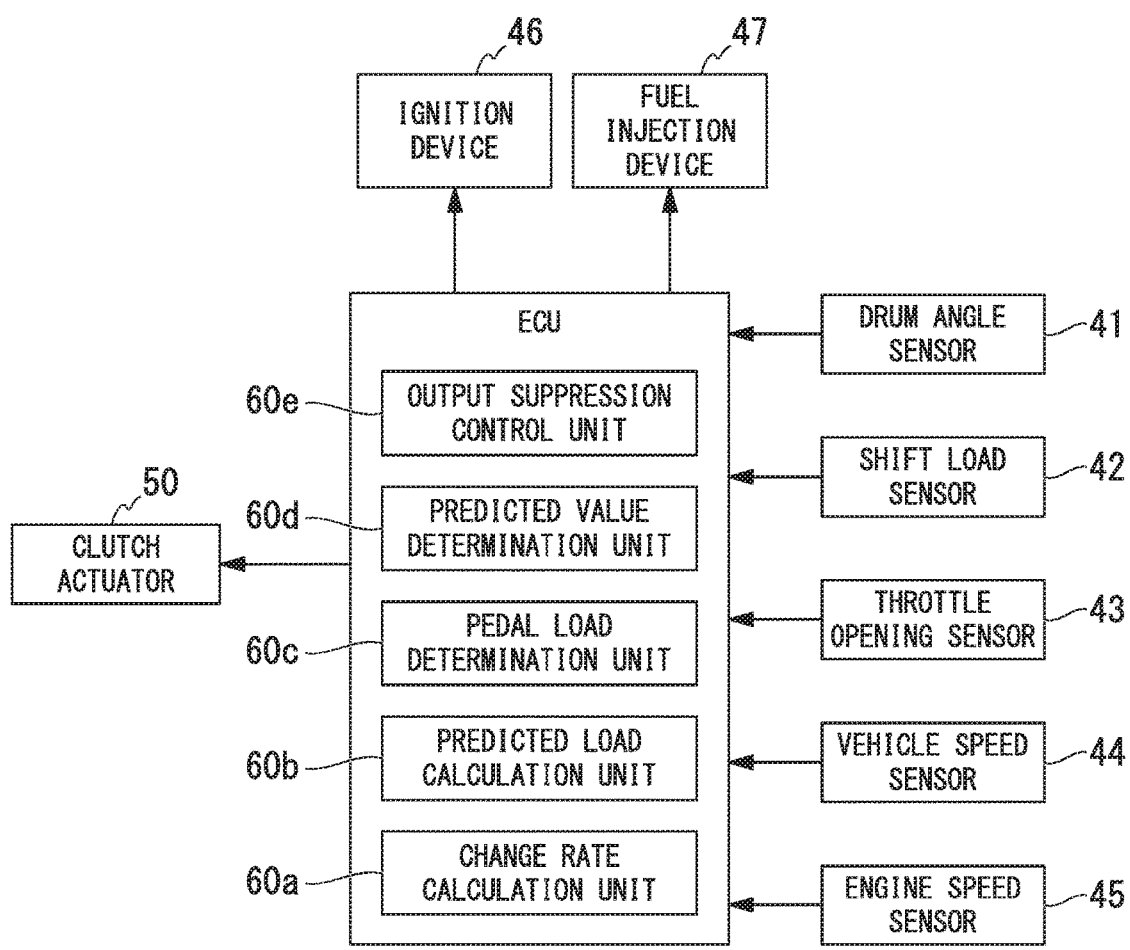
FIG. 4 is a block diagram of a gear shift system.

As shown in FIG. 4, the gear shift system includes the clutch actuator 50, an electronic control unit (ECU, a control unit) 60 and various sensors 41 to 45.

The ECU 60 controls operations of an ignition device 46 and a fuel injection device 47 while controlling an operation of the clutch actuator 50 on the basis of detection information from a drum angle sensor (a gear position sensor) 41 configured to detect a shifting unit from a pivot angle of the shift drum 36 and a shift load sensor (a torque sensor) 42 configured to detect an operating torque input into the shift spindle 31 and detection information of various vehicle states from a throttle opening sensor 43, a vehicle speed sensor 44, an engine speed sensor 45, and so on. Detection information from hydraulic pressure sensors 57 and 58 which will be described below is also input into the ECU 60. The ECU 60 is equipped with a change rate calculation unit 60a, a predicted load calculation unit 60b, a pedal load determination unit 60c, a predicted value determination unit 60d, and an output suppression control unit 60e, and the functions thereof will be described later Referring also to FIG. 3, the clutch actuator 50 can control a liquid pressure that cuts and connects the clutch device 26 as the clutch actuator 50 is operationally controlled by the ECU 60. The clutch actuator 50 includes an electric motor 52 serving as a drive source (hereinafter, simply referred to as a motor 52), and a master cylinder 51 driven by the motor 52. The clutch actuator 50 constitutes an integrated clutch control unit 50A, together with a hydraulic pressure circuit device 53 provided between the master cylinder 51 and the hydraulic pressure supply and discharge port 50p.

The master cylinder 51 strokes a piston 51b in a cylinder main body 51a by driving the motor 52, and can supply and discharge a working fluid in the cylinder main body 51a into/from a slave cylinder 28. Reference numeral 55 designates a conversion mechanism as a ball spring mechanism, reference numeral 54 designates a transmission mechanism stretched between the motor 52 and the conversion mechanism 55, and reference numeral 51e designates a reservoir connected to the master cylinder 51 in the drawing.

The hydraulic pressure circuit device 53 has a valve mechanism (a solenoid valve 56) configured to open or block an intermediate area of a main oil path (hydraulic pressure supply and discharge oil path) 53m extending from the master cylinder 51 toward the clutch device 26 (the slave cylinder 28). The main oil path 53m of the hydraulic pressure circuit device 53 is divided into an upstream side oil path 53a closer to the master cylinder 51 than the solenoid valve 56, and a downstream side oil path 53b closer to the slave cylinder 28 than the solenoid valve 56. The hydraulic pressure circuit device 53 further includes a bypass oil path 53c that bypasses the solenoid valve 56 and brings the upstream side oil path 53a and the downstream side oil path 53b in communication with each other.

The solenoid valve 56 is a so-called normal open valve. A one way valve 53c1 configured to cause a working fluid to flow in only one direction from an upstream side toward a downstream side is installed in the bypass oil path 53c. An upstream side hydraulic pressure sensor 57 configured to detect a hydraulic pressure of the upstream side oil path 53a is installed upstream from the solenoid valve 56. A downstream side hydraulic pressure sensor 58 configured to detect a hydraulic pressure of the downstream side oil path 53b is installed downstream from the solenoid valve 56.

As shown in FIG. 1, the clutch control unit 50A is accommodated in, for example, the rear cowl 9a. The slave cylinder 28 is attached to a rear section of the crank case 15 on the left side. The clutch control unit 50A and the slave cylinder 28 are connected to each other via a hydraulic pressure pipeline 53e (see FIG. 3).

As shown in FIG. 2, the slave cylinder 28 is disposed coaxially with the main shaft 22 on the left side. The slave cylinder 28 presses a push rod 28a passing through the main shaft 22 rightward when a hydraulic pressure from the clutch actuator 50 is supplied. The slave cylinder 28 actuates the clutch device 26 to a connected state via the push rod 28a by pressing the push rod 28a rightward. The slave cylinder 28 releases the pressing against the push rod 28a and returns the clutch device 26 to a disconnected state when no hydraulic pressure is supplied.

While a hydraulic pressure should be continuously supplied to maintain the clutch device 26 in the connected state, electric power is consumed to that extent. Here, as shown in FIG. 3, the solenoid valve 56 is installed in the hydraulic pressure circuit device 53 of the clutch control unit 50A, and the solenoid valve 56 is closed after supply of the hydraulic pressure toward the clutch device 26. Accordingly, a configuration for maintaining the hydraulic pressure supplied toward the clutch device 26 and supplementing a hydraulic pressure to an extent of a decrease in pressure (recharging the hydraulic pressure to an extent of leakage) is provided, and energy consumption is suppressed.

Figure 5:
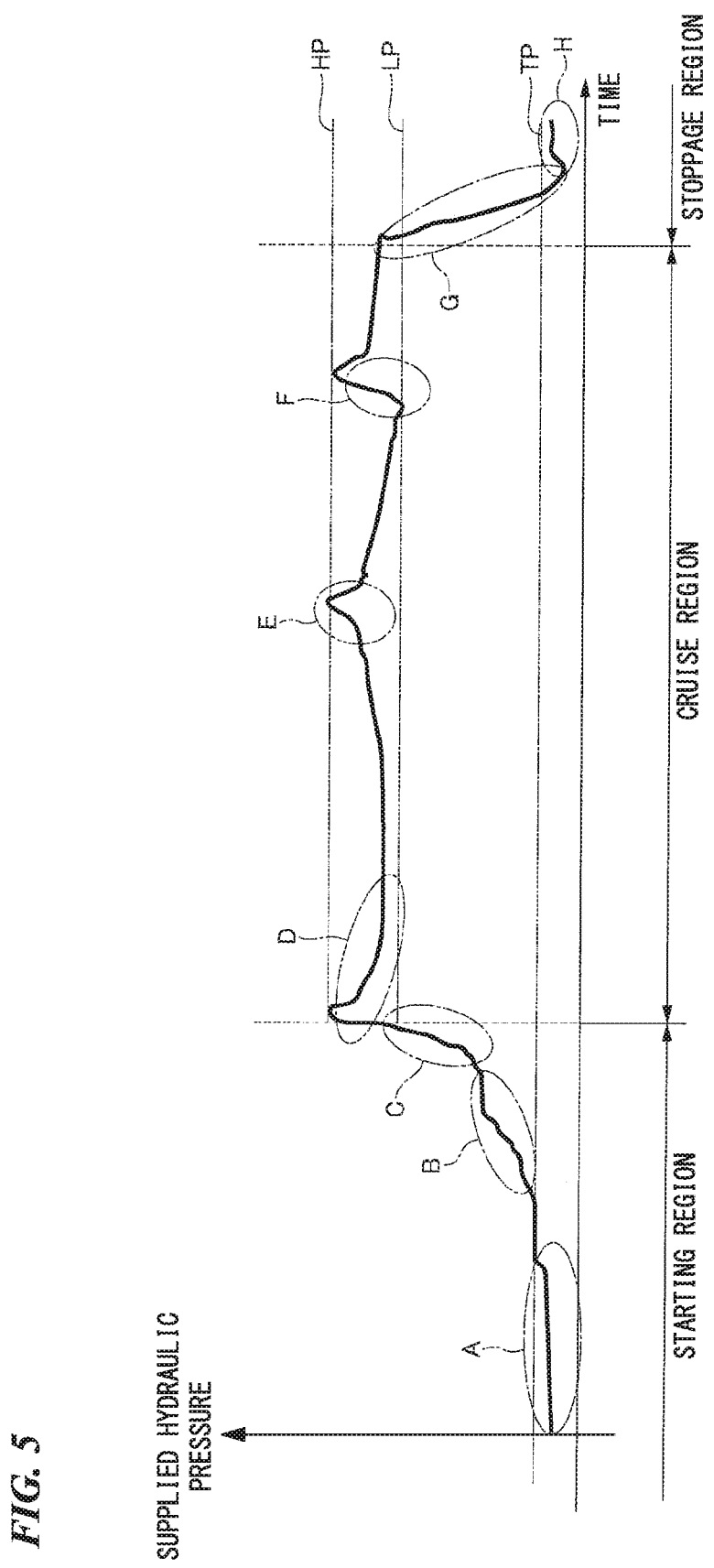
FIG. 5 is a graph showing a variation of a supplied hydraulic pressure in the clutch actuator.

Next, an action of the clutch control system will be described with reference to a graph of FIG. 5. In the graph of FIG. 5, a vertical axis represents a supplied hydraulic pressure detected by the downstream side hydraulic pressure sensor 58, and a horizontal axis represents the passage of time.

During stoppage (idling) of the motorcycle 1, the motor 52 and the solenoid valve 56 controlled by the ECU 60 are in a state in which supply of electric power is disconnected. That is, the motor 52 is in a stopped state and the solenoid valve 56 is in an open state. Here, the slave cylinder 28 side (a downstream side) is in a low pressure state with pressure lower than a touch point hydraulic pressure TP, and the clutch device 26 is in a disengaged state (a disconnected state, a released state). The state corresponds to a region A of FIG. 5.

During starting of the motorcycle 1, when a rotation number of the engine 13 is increased, electric power is supplied to the motor 52 only, a hydraulic pressure is supplied from the master cylinder 51 to the slave cylinder 28 via the solenoid valve 56 in the open state. When the hydraulic pressure on the side of the slave cylinder 28 (a downstream side) is increased to be higher than the touch point hydraulic pressure TP, engagement of the clutch device 26 is started, and the clutch device 26 is in a half clutch state in which some power can be transmitted. Accordingly, smooth starting of the motorcycle 1 becomes possible. This state corresponds to a region B of FIG. 5.

Then, when the difference between the input rotation and the output rotation of the clutch device 26 is reduced and a hydraulic pressure on the side of the slave cylinder 28 (the downstream side) reaches a lower limit holding hydraulic pressure LP, the engagement of the clutch device 26 is shifted to the locked state, and a driving force of the engine 13 is entirely transmitted to the gearbox 21. This state corresponds to a region C of FIG. 5. The regions A to C are set as a starting region.

When hydraulic pressure is supplied from the master cylinder 51 side to the slave cylinder 28 side, the solenoid valve 56 is set to the open state, and the motor 52 is energized and driven forward to press the master cylinder 51. As a result, the hydraulic pressure on the side of the slave cylinder 28 is regulated to the clutch engagement hydraulic pressure. At this time, driving of the clutch actuator 50 is feedback-controlled on the basis of the detected hydraulic pressure of the downstream side hydraulic pressure sensor 58.

Then, when the hydraulic pressure on the side of the slave cylinder 28 (the downstream side) reaches an upper limit holding hydraulic pressure HP, supply of electric power to the motor 52 is stopped and generation of a hydraulic pressure is stopped while electric power is supplied to the solenoid valve 56 and the solenoid valve 56 is closed. That is, while the upstream side is in a low pressure state as the hydraulic pressure is released, the downstream side is maintained in a high pressure state (the upper limit holding hydraulic pressure HP). Accordingly, the clutch device 26 can be maintained in an engaged state without generation of a hydraulic pressure by the master cylinder 51, and electric power consumption can be suppressed while traveling of the motorcycle 1 is possible.

Here, depending on the gear shifting operation, there may be a case in which the gear shifting is performed immediately after the hydraulic pressure is filled to the clutch device 26. In this case, before the solenoid valve 56 is closed and the upstream side is brought into the low-pressure state, the motor 52 is driven in the reverse direction while the solenoid valve 56 remains in the valve open state, the pressure of the master cylinder 51 is reduced, the reservoir 51e is caused to communicate, and the hydraulic pressure on the clutch device 26 is released to the master cylinder 51 side. At this time, driving of the clutch actuator 50 is feedback-controlled on the basis of the detected hydraulic pressure of the upstream side hydraulic pressure sensor 57.

Even in a state in which the solenoid valve 56 is closed, and the clutch device 26 is maintained in the engaged state, as shown in a region D of FIG. 5, a hydraulic pressure on the downstream side is gradually decreased (leaks). That is, the hydraulic pressure on the downstream side gradually decreases, due to factors such as hydraulic pressure leakage or temperature drop caused by deformation of tools such as the solenoid valve 56 and seal of the one way valve 53c1.

On the other hand, as in the region E of FIG. 5, there is also a case in which the hydraulic pressure on the downstream side rises due to a temperature rise or the like. If there is a fine hydraulic pressure fluctuation on the downstream side, it can be absorbed by an accumulator (not shown), and the electric power consumption is not increased by operating the motor 52 and the solenoid valve 56 each time the hydraulic pressure fluctuates.

As in the region E of FIG. 5, when the hydraulic pressure on the downstream side rises to the upper limit holding hydraulic pressure HP, the solenoid valve 56 is gradually opened to relieve the hydraulic pressure on the downstream side to the upstream side, by lowering the power supply to the solenoid valve 56 or the like.

As shown in a region F of FIG. 5, when the hydraulic pressure on the downstream side is decreased to the lower limit holding hydraulic pressure LP, supply of electric power to the motor 52 is started while the solenoid valve 56 is closed, and the hydraulic pressure on the upstream side is increased. When the hydraulic pressure on the upstream side is higher than the hydraulic pressure on the downstream side, the hydraulic pressure is supplemented (recharged) to the downstream side via the bypass oil path 53c and the one way valve 53c1. When the hydraulic pressure on the downstream side reaches the upper limit holding hydraulic pressure HP, supply of electric power to the motor 52 is stopped and generation of a hydraulic pressure is stopped. Accordingly, the hydraulic pressure on the downstream side is maintained between the upper limit holding hydraulic pressure HP and the lower limit holding hydraulic pressure LP, and the clutch device 26 is maintained in an engaged state. The regions D to F are set as a cruise region.

During stoppage of the motorcycle 1, supply of electric power to the motor 52 and the solenoid valve 56 is also stopped. Accordingly, the master cylinder 51 stops generation of a hydraulic pressure and stops supply of a hydraulic pressure to the slave cylinder 28. The solenoid valve 56 is in an open state, and a hydraulic pressure in the downstream side oil path 53b is returned to the reservoir 51e. Accordingly, the slave cylinder 28 side (the downstream side) is in a low pressure state with pressure lower than the touch point hydraulic pressure TP, and the clutch device 26 is in a disengaged state. This state corresponds to regions G and H of FIG. 5. The regions G and H are set as a stoppage region.

Next, the gear shifting control of the motorcycle 1 will be described with reference to FIGS. 6 and 7.

First, the gear shifting control of the comparative example will be described.

Figure 6:
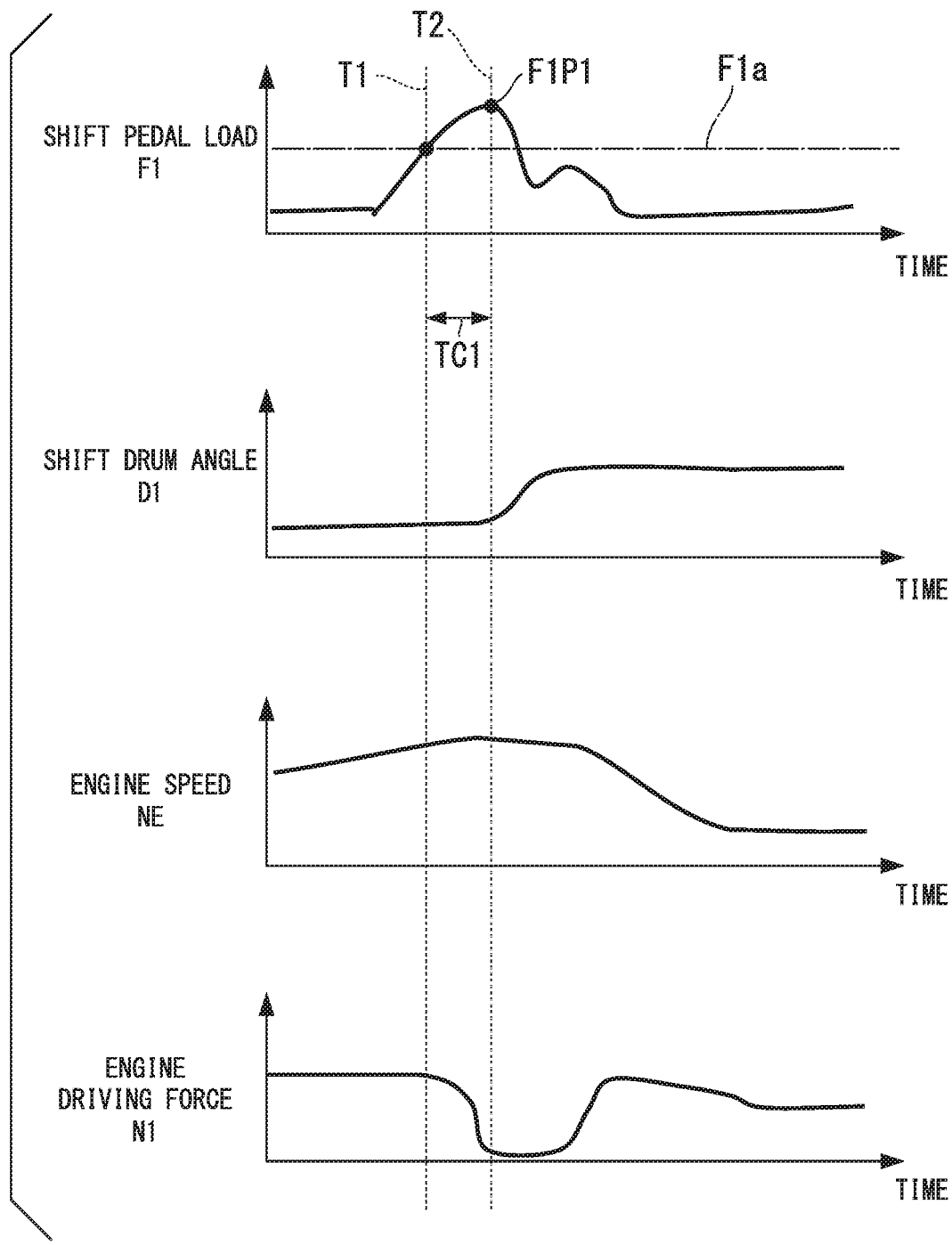
FIG. 6 is a graph showing changes over time in a shift pedal load, a shift drum angle, an engine speed, and an engine driving force in a comparative example.

As shown in FIG. 6, when the load (shift pedal load) F1 which is input to the shift pedal 32 by the foot operation of the occupant rises and exceeds the gear shifting control start load value (in other words, the engine cooperation control start load value) F1a that is the threshold value, the ECU 60 determines that the shifting operation (the foot operation of the shift pedal 32) of the gearbox 21 is performed, and temporarily lowers the engine driving force (torque) N1 by the output suppression control such as the ignition cut of the ignition device 46 or the fuel injection cut of the fuel injection device 47.

The temporary driving force loss occurs in the gearbox 21 due to the decrease in the engine driving force N1, and by switching the engagement of the dog of the shifting gear group 24 at this timing, smooth shifting is enabled. The decrease in the engine driving force N1 is steep, and even when returning to the engine control before the output suppression control after the specified time, the engine driving force N1 rapidly rises. Thereafter, the engine driving force N1 gradually changes to the driving force corresponding to the gear stage after the gear shifting. At the timing of lowering the engine driving force N1, the rise of the engine speed NE stops and the engine speed starts to slightly decrease. Thereafter, the engine speed NE gradually decreases toward the rotational speed corresponding to the gear stage after the gear shifting.

In the shift drum 36, the timing after a specified time TC1 from the timing T1 of the gear shifting control start (in other words, the engine cooperative control start) is the timing of the operation start (change in the shift drum angle D1). The timing T1 is the timing at which the shift pedal load F1 reaches the gear shifting control start load value F1a. A timing T2 at which the specified time TC1 has passed from the timing T1 is a timing at which the shift drum 36 starts operation.

The specified time TC1 (drum operation time) from the gear shifting control start to the operation start of the shift drum 36 is stable at 30 to 50 msec. On the other hand, the speed of the operation of the shift pedal 32 depends on the occupant, and there is a difference in the gradient of the rise of the operation load (shift pedal load F1) of the shift pedal 32. Therefore, the peak value (hereinafter referred to as "pedal peak load") F1P1 of the shift pedal load F1 when the shift drum 36 starts to operate (at the time of gear shifting start) is different depending on the pedal operation speed (that is, variation occurs).

When the shifting operation is accelerated, since the pedal peak load F1P1 also increases, the fast shifting operation gives the impression that the gear shifting operation is heavy. When the gear shifting control start load value F1a which is a trigger of the gear shifting start is merely lowered, there is a possibility that an unintended gear shifting operation may occur due to influences such as disturbance to the shift pedal 32 or noise of the sensor.

Figure 7:
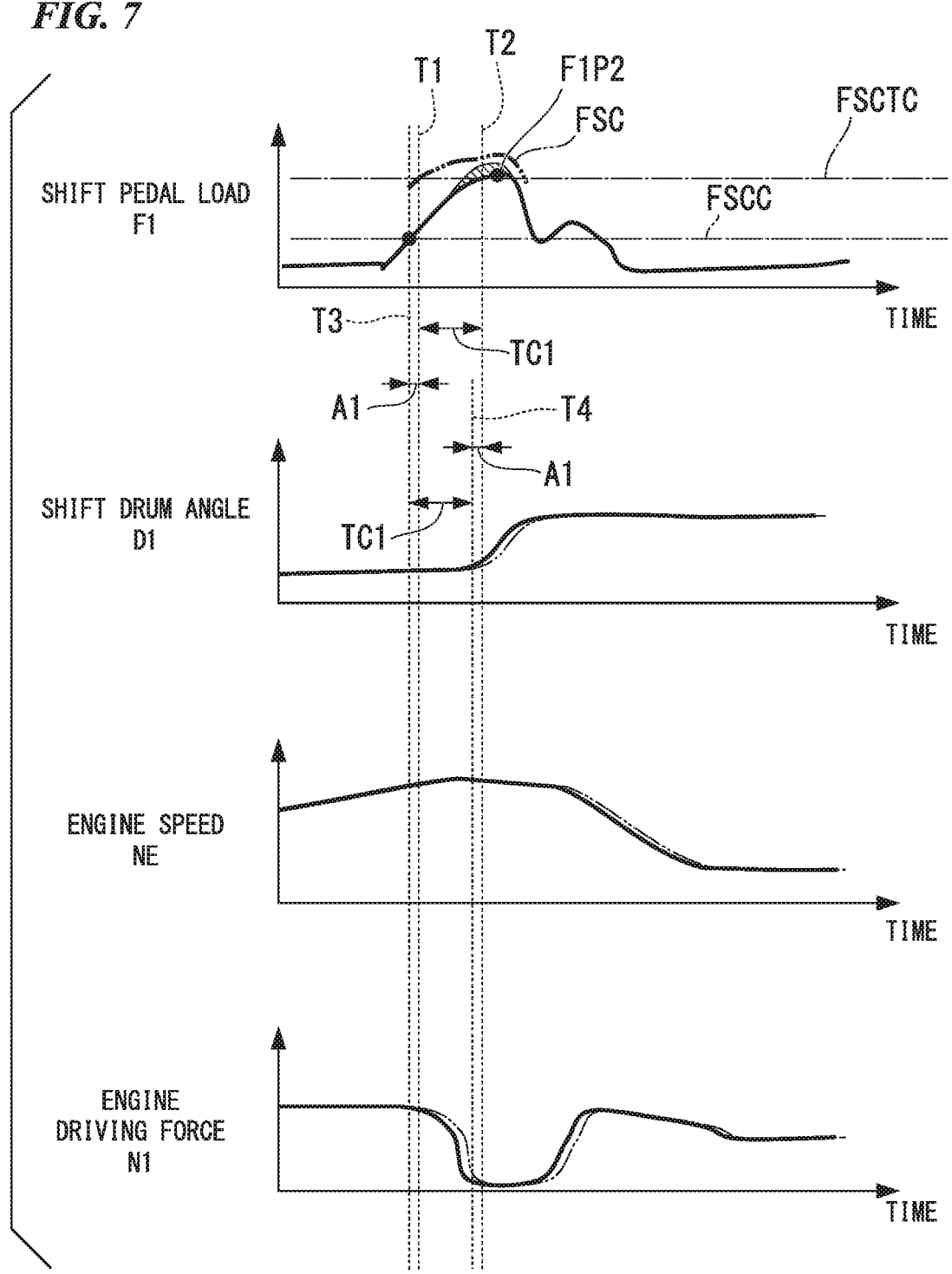
FIG. 7 is a graph showing changes over time in the shift pedal load, the shift drum angle, the engine speed, and the engine driving force in the embodiment of the present invention.

Therefore, in this embodiment, as shown in FIG. 7, a predicted value (pedal load prediction value FSC) of the shift pedal load F1 is calculated, and at the timing when it is determined that the pedal load prediction value FSC exceeds the threshold value (gear shifting allowance load value FSCTC), the gear shifting operation is started in advance. In the present embodiment, the continuation of the change (gradient) of the shift pedal load F1 is checked to calculate the pedal load prediction value FSC from the time change rate (a pedal load difference average value DFSA to be described later).

A timing T3 for calculating the pedal load prediction value FSC is the timing at which the shift pedal load F1 reaches the predicted control allowance load value FSCC (a first threshold value). A timing T4 at which the specified time TC1 has passed from the timing T3 is the timing at which the shift drum 36 starts operation. The predicted control allowance load value FSCC is smaller than the gear shifting control start load value F1a of the comparative example, and the timings T3 and T4 of the present embodiment are timings earlier than those of the control amount A1 from the timings T1 and T2 of the comparative example, respectively.

Further, when the timing at which the shift drum 36 starts rotating and the timing at which the driving force loss of the gearbox 21 occurs are shifted by the same amount, the gear shifting operation is smooth and does not increase the shift pedal load F1. Further, the shift drum angle D1, the engine speed NE, and the engine driving force N1 of the comparative example are shown by chain lines in FIG. 7. Further, since the time from the operation start to the rotating start of the shift drum 36 is shortened, the occupant is suppressed from excessively applying the shift pedal load F1. Thus, since the pedal peak load F1P2 is lower than the pedal peak load F1P1 of the comparative example, it is possible to improve the shift feeling by suppressing the variation of the pedal peak load.

Figure 8:
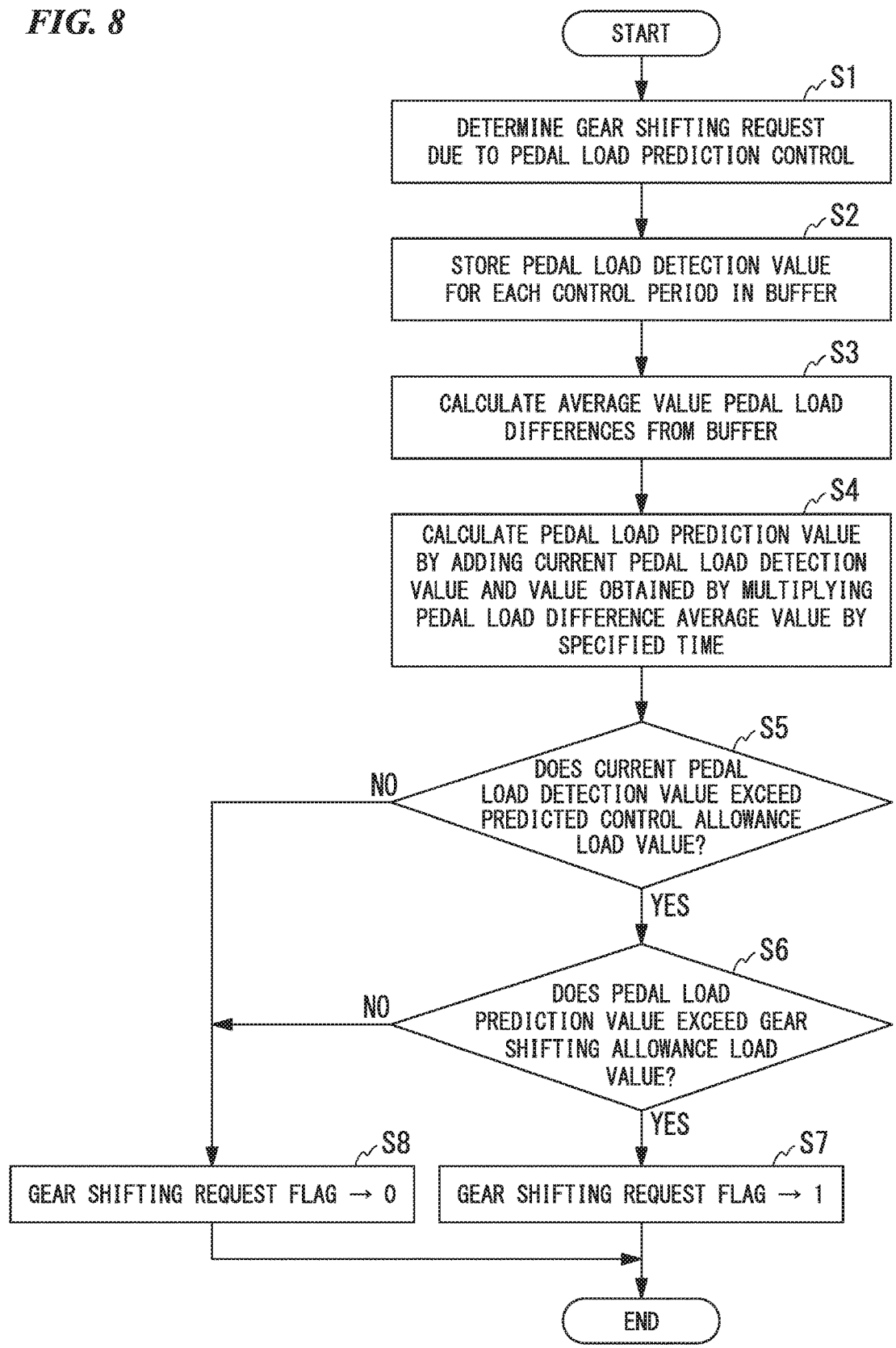
FIG. 8 is a flowchart showing an overview of the gear shifting control.

Next, an example of processing performed by the ECU 60 will be described with reference to the flowchart of FIG. 8. The control flow shown in FIG. 8 is repeatedly executed at a prescribed control period (1 to 10 msec) when the power supply is turned ON (the main switch is turned ON).

As the power supply is turned on, the ECU 60 starts the gear shifting request determination by the pedal load prediction control (step S1). Specifically, a change rate calculation unit 60a (change rate calculation means) of the ECU 60 stores the pedal load detection value FS (N·msec) detected by the shift load sensor 42 in the buffer as a pedal load buffer value FSB at each control cycle (Step S2). Further, each time the pedal load buffer value FSB is stored, the difference (pedal load difference DFS) between the stored pedal load buffer value FSB (n) and the pedal load buffer value FSB (n−1) stored just before is calculated, and for example, an average value (pedal load difference average value DFSA) is calculated from the latest three consecutive pedal load differences DFS (step S3).

Next, the predicted load calculation unit 60b (load prediction unit) of the ECU 60 calculates the pedal load prediction value FSC by adding the current pedal load detection value FS detected by the shift load sensor 42 and the value obtained by multiplying the pedal load difference average value DFSA by the specified time TC1 (step S4). The specified time TC1 is 30 to 50 msec, but the value used in step S4 is, for example, set to 45 msec. Further, setting of the specified time TC1 can be changed within 10 to 70 msec depending on the type of vehicle. When the vehicle is equipped with dog missions, it is more preferable that setting of the specified time TC1 be changeable within 30 to 50 msec.

Thereafter, a pedal load determination unit 60c (pedal load determining means) of the ECU 60 determines whether the current pedal load detection value FS is equal to or greater than the predicted control allowance load value FSCC (step S5). In the case of YES in step S5 (the current pedal load detection value FS is equal to or greater than the predicted control allowance load value FSCC), next, the predicted value determination unit 60d (predicted value determining means) of the ECU 60 determines whether the pedal load prediction value FSC is equal to or greater than the gear shifting allowance load value FSCTC (a second threshold value) (step S6). In the case of YES in step S6 (the pedal load prediction value FSC is equal to or greater than the gear shifting allowance load value FSCTC), a gear shifting request flag is set to "1" (step S7), and the process is temporarily ended. In the case of NO in step S5 (the current pedal load detection value FS is less than the predicted control allowance load value FSCC) or NO in step S6 (the pedal load prediction value FSC is less than the gear shifting allowance load value FSCTC), the gear shifting request flag is reset to "0" (step S8), and the process is temporarily ended. When the gear shifting request flag becomes "1," the output suppression control unit 60e (output suppression controlling means) of the ECU 60 executes the output suppression control such as an ignition cut or a fuel injection cut.

The predicted control allowance load value FSCC of step S5 is smaller than the gear shifting control start load value F1a of the comparative example, and the ECU 60 can execute the output suppression control and the gear shifting control faster than in the comparative example. That is, when the gear shifting request flag becomes "1," the ECU 60 starts the gear shifting operation in advance as compared to the comparative example. The EUC 60 calculates the pedal load prediction value FSC at the timing T3 earlier than the timing T1 of the gear shifting control start of the comparative example, and determines the gear shifting request in advance on the basis of the pedal load prediction value FSC. Since the pedal load prediction value FSC is calculated on the basis of the time change rate of the pedal load detection value FS, the prediction accuracy of the shift pedal load F1 is high. Therefore, it is easy to secure the shift pedal load F1 enough to rotate the shift drum 36 at the timing T3. Since the gear shifting control is started from the early stage of the gear shifting operation, the occupant can quickly recognize the completion of the gear shifting operation, and the pedal peak load is also suppressed.

As described above, in the above embodiment, in the gear shifting control device equipped with the shift load sensor 42 which detects the gear shifting operation of the shift pedal 32, and the ECU 60 which performs the output suppression control for suppressing the output of the engine 13 in accordance with the gear shifting operation detected by the shift load sensor 42, the ECU 60 includes a change rate calculation unit 60a which calculates a time change rate (the pedal load difference average value DFSA) of the pedal load detection value FS detected by the shift load sensor 42, a predicted load calculation unit 60b which obtains the pedal load prediction value FSC after a specified time TC1 elapses from the time change rate, a pedal load determination unit 60c which determines whether or not the pedal load detection value FS reaches the first threshold value (the predicted control allowance load value FSCC), a predicted value determination unit 60d which determines whether or not the pedal load prediction value FSC exceeds the second threshold value (gear shifting allowance load value FSCTC) when the pedal load detection value FS reaches the first threshold value, and an output suppression control unit 60e which performs the output suppression control when it is determined that the pedal load prediction value FSC exceeds the second threshold value.

According to this configuration, in the gear shifting control device that performs the gear shifting operation with the shift pedal 32, the time change rate (pedal load difference average value DFSA) of the pedal load detection value FS by the shift load sensor 42 is obtained, the pedal load prediction value FSC after the elapse of the specified time TC1 from the time change rate is obtained, and when it is determined that the pedal load prediction value FSC exceeds the second threshold value, the output suppression control of the engine 13 is performed. This makes it possible to start the output suppression control of the engine 13 in advance before the actual pedal load detection value FS reaches the second threshold value. Therefore, even when a quick gear shifting operation is performed, it is possible to start the output suppression control at an early stage of the gear shifting operation. On the other hand, since the pedal load prediction value FSC is obtained from the time change rate of the pedal load detection value FS, erroneous detection of the gear shifting operation is also suppressed. Further, since the drive force loss of the gearbox 21 is caused in advance to start the gear shifting operation, excessive application of the shift pedal load F1 is suppressed. Therefore, it is possible to suppress variations in the pedal peak load due to the difference in the speed of the gear shifting operation, and to improve the shift feeling.

Further, in the above embodiment, the predicted load calculation unit 60b adds the change amount obtained by multiplying the time change rate by the specified time TC1 to the current pedal load detection value FS, thereby calculating the pedal load prediction value FSC.

According to this configuration, since the pedal load prediction value FSC is obtained by a simple calculation of merely adding the value obtained by multiplying the time change rate by the specified time TC1 to the current pedal load detection value FS, it is possible to reduce the processing load on the ECU 60 and to suppress delays of the engine control.

Further, in the above embodiment, the change rate calculation unit 60a calculates the average value of the pedal load difference DFS obtained from the several pedal load detection values FS detected continuously at the control cycle as the time change rate.

According to this configuration, since the time change rate is calculated as the average value of the pedal load difference DFS obtained from the multiple pedal load detection values FS, the processing load of the ECU 60 can be reduced, and even when a single abnormal value occurs in the pedal load detection value FS, it is possible to reduce the influence of erroneous detection on engine control.

Further, in the aforementioned embodiment, the change rate calculation unit 60a calculates the average value of several consecutive, e.g., three, pedal load differences DFS as the time change rate.

According to this configuration, since the average value of three consecutive pedal load differences DFS is calculated as the time change rate, it is possible to reduce the processing load of the ECU 60 and to reduce the influence of the erroneous detection on the engine control.

Further, in the aforementioned embodiment, when the pedal load detection value FS reaches the first threshold value, the predicted value determination unit 60d determines whether the pedal load prediction value FSC obtained from the latest time change rate exceeds the second threshold value.

According to this configuration, when the pedal load detection value FS reaches the first threshold value, by determining the pedal load prediction value FSC obtained from the latest time change rate, it is possible to perform the engine control immediately responding to the gear shifting operation.

Further, in the aforementioned embodiment, the change rate calculation unit 60a always calculates the time change rate during operation of the engine 13.

According to this configuration, since the time change rate of the pedal load detection value FS is always calculated during the operation of the engine 13, even when the gear shifting operation is quickly performed, it is always possible to obtain the latest time change rate close to the instant of the gear shifting operation, and to suppress a delay in the engine control with respect to the gear shifting operation.

Further, in the above embodiment, the predicted load calculation unit 60b can set the specified time TC1 multiplied by the time change rate within a range of 10 to 70 msec.

According to this configuration, by enabling the specified time TC1 multiplied by the time change rate to be set within the range of 10 to 70 msec, it is possible to regulate the specified time TC1 multiplied by the time change rate in accordance with the characteristics of the vehicle equipped with the gear shifting control device, and it is possible to enhance the accuracy of the pedal load prediction value FSC to perform the engine control at a good timing.

Further, in the aforementioned embodiment, the shift pedal 32 performs the gear shifting operation of the dog mission (the gearbox 21) connected to the engine 13, and the predicted load calculation unit 60b can set the specified time TC1 multiplied by the time change rate within a range of 30 to 50 msec.

According to this configuration, since the specified time TC1 multiplied by the time change rate can be set within the range of 30 to 50 msec in accordance with the time of 30 to 50 msec required for the gear shifting operation of the dog mission, the engine control can be performed at a good timing.

Further, the present invention is not limited to the aforementioned embodiment, and for example, the ECU 60 may be integrally provided in the clutch control unit 50A. The ECU 60 may be combined with a clutch device which is brought into a disconnected state by the supply of hydraulic pressure from the master cylinder 51.

The pedal load difference average value DFSA may be calculated as an average value of two consecutive pedal load differences DFS or four or more pedal load differences DFS.

A load prediction means which obtains a pedal load prediction value predicted from the time change rate from a map may be provided.

The present invention is not limited to application to a saddle type vehicle in which the clutch operation is automated as in the aforementioned embodiment, but the present invention is also applicable to a saddle type vehicle equipped with a so-called clutch operationless gearbox in which the driving force is adjusted without performing the manual clutch operation under the predetermined conditions to allow the gear shifting, while being based on the manual clutch operation.

The present invention is not limited to a motorcycle and may be applied to a three-wheeled vehicle (including a two-front-wheeled and one-rear-wheeled vehicle in addition to a one-front-wheeled and two-rear-wheeled vehicle) or a four-wheeled vehicle.

Moreover, the configuration in the above embodiment is an example of the present invention, and various modifications are possible without departing from the gist of the present invention, such as replacing the constituent elements of the embodiment with well-known constituent elements.

What is claimed is:
1. A gear shifting control device comprising:
   a pedal operation detection unit which detects a gear shifting operation of a shift pedal; and
   a control unit which performs output suppression control for suppressing output of an engine in accordance with the gear shifting operation detected by the pedal operation detection unit,
   wherein the control unit includes:
      a change rate calculation unit which calculates a time change rate of a pedal load detection value detected by the pedal operation detection unit;
      a load prediction unit which obtains a pedal load prediction value after a specified time elapses from the time change rate;
      a pedal load determination unit which determines whether or not the pedal load detection value reaches a first threshold value;
      a predicted value determination unit which determines whether or not the pedal load prediction value exceeds a second threshold value when the pedal load detection value reaches the first threshold value; and an output suppression control unit which performs the output suppression control when it is determined that the pedal load prediction value exceeds the second threshold value.

2. The gear shifting control device according to claim 1, wherein the load prediction unit calculates the pedal load prediction value by adding a change amount obtained by multiplying the time change rate by the specified time to the current pedal load detection value.

3. The gear shifting control device according to claim 1, wherein the change rate calculation unit calculates an average value of pedal load differences obtained from the multiple pedal load detection values consecutively detected at a control cycle as the time change rate.

4. The gear shifting control device according to claim 3, wherein the change rate calculation unit calculates an average value of the multiple consecutive pedal load differences as the time change rate.

5. The gear shifting control device according to claim 1, wherein the predicted value determination unit determines whether or not the pedal load prediction value obtained from the latest time change rate exceeds the second threshold value when the pedal load detection value reaches the first threshold value.

6. The gear shifting control device according to claim 1, wherein the change rate calculation unit always calculates the time change rate during operation of the engine.

7. The gear shifting control device according to claim 1, wherein the load prediction unit enables the specified time multiplied by the time change rate to be set within a range of 10 to 70 msec.

8. The gear shifting control device according to claim 1, wherein the shift pedal performs a gear shifting operation of a dog mission connected to the engine, and the load prediction unit enables the specified time multiplied by the time change rate to be set within a range of 30 to 50 msec.

* * * * *